Feb. 12, 1935.   E. R. GREER   1,990,731
TRAILER HITCH
Filed Nov. 2, 1931   5 Sheets-Sheet 1

Inventor
EDWARD R. GREER
By Paul, Paul & Moore
ATTORNEYS

Feb. 12, 1935.  E. R. GREER  1,990,731
TRAILER HITCH
Filed Nov. 2, 1931  5 Sheets-Sheet 2

Inventor
EDWARD R. GREER
By [signature]
ATTORNEYS

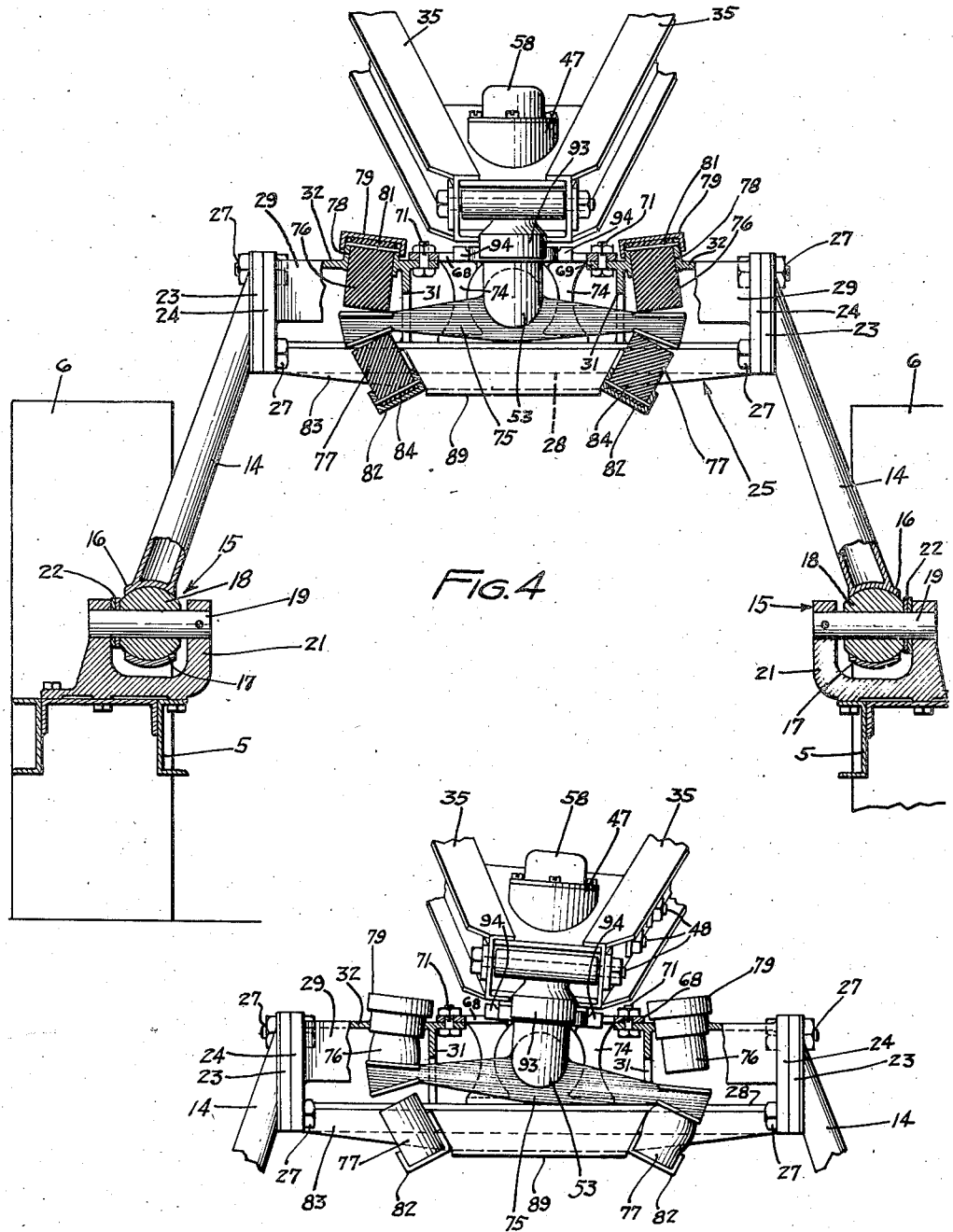

Feb. 12, 1935.   E. R. GREER   1,990,731
TRAILER HITCH
Filed Nov. 2, 1931   5 Sheets-Sheet 5

Inventor
EDWARD R. GREER
By Paul, Paul & Moore
ATTORNEYS

Patented Feb. 12, 1935

1,990,731

UNITED STATES PATENT OFFICE 1,990,731

TRAILER HITCH

Edward R. Greer, Minneapolis, Minn.

Application November 2, 1931, Serial No. 572,530

22 Claims. (Cl. 280—33.44)

This invention relates to new and useful improvements in trailer hitches and more particularly to such a hitch adapted for connecting a semi-trailer to a tractor of the crawler type.

In the operation of a tractor and semi-trailer, the connection between the tractor and trailer, commonly termed a "tractor hitch", should be so constructed as to reduce to a minimum the strains imparted to the hitch, as a result of the relative tilting and rocking movements of the tractor with respect to the trailer, when traveling over rough and uneven ground. It is therefore essential that the hitch be so constructed as to permit free universal movement of the tractor with respect to the trailer, whereby the apparatus may travel over banks, fills, and other rough places, without imparting undue strains to any part of the hitch. The novel hitch herein disclosed is so designed and constructed as to substantially eliminate the usual imperfections often found in hitches of this general character, whereby the tractor and trailer may be used in rough places without danger of any of the parts of the hitch becoming broken or damaged, as a result of being subjected to heavy strain.

An object of the invention is to provide an improved trailer hitch more particularly adapted for use in connection with a tractor, of the crawler type, comprising the usual track frames, traction belts, and drive sprockets therefor, said hitch having ball-and-socket connections with the tractor track frames forwardly of the rear drive sprockets thereof, whereby a portion of the weight of the trailer will be transmitted directly to the track frames and will tend to hold the traction belts flatly against the ground and thereby prevent raising of the forward end of the tractor.

A further object is to provide a trailer hitch comprising a pair of downwardly extending arms having ball-and-socket joints at their lower ends for pivotally connecting them to the tractor, said hitch comprising an L-shaped shaft having a vertically disposed portion adapted to be connected with the forward portion of the trailer and permitting free turning movement of the tractor with respect to the trailer, and said shaft also having a horizontally disposed portion permitting free lateral tilting movement of the tractor, and suitable means being provided for limiting the longitudinal and lateral tilting movements of the tractor with respect to the trailer.

Other objects of the invention reside in the simple and inexpensive construction of the hitch; in the means provided for connecting it to the usual track frames of the tractor; in the provision of the L-shaped shaft which permits free turning movement of the tractor and free lateral tilting movement thereof; in the means provided for compensating for the change in distance between the pivotal connections of the arms with the track frames, as a result of the track frames relatively oscillating with respect to each other, as when traveling over rough uneven ground; and in the novel means provided for limiting the tilting movements of the tractor with respect to the semi-trailer.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 4 is a cross sectional view showing the universal connections between the arms of the hitch and the traction frames, and also the means for limiting lateral tilting movement of the tractor with respect to the trailer;

Figure 5 is a view showing the trailer tilted to one side and the means for limiting such tilting movement;

Figure 1:
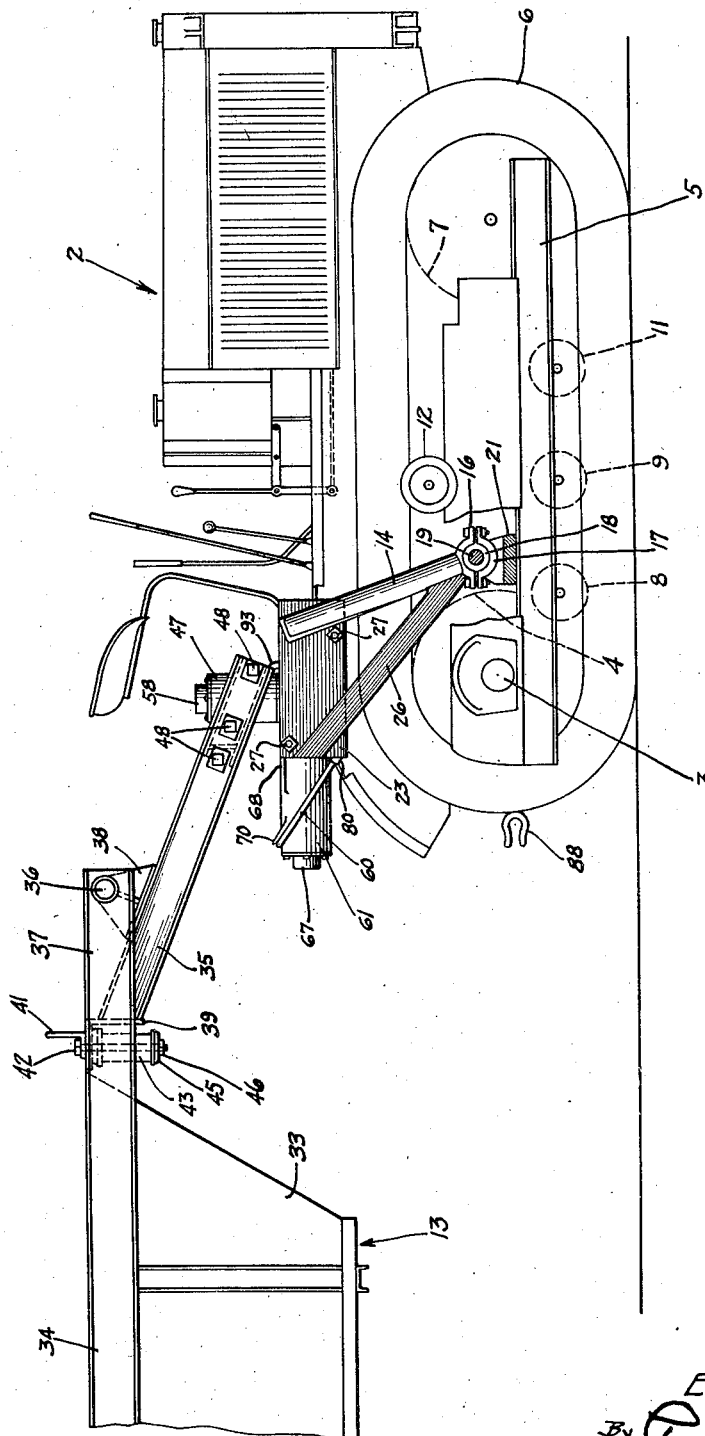
Figure 1 is a side view showing a tractor of the conventional crawler type, and showing the improved hitch attached to the usual track frames thereof.

In the selected embodiment of the invention here shown, for purposes of disclosure, there is illustrated in Figure 1, a conventional tractor of the crawler type, comprising the usual body 2 provided at its rear with a sprocket drive shaft 3, upon which is mounted the usual drive sprockets 4, indicated in dotted lines. The usual track frames 5 are shown pivotally mounted upon the sprocket shafts 3 and support the usual traction belts 6. The track frames are shown provided at their forward ends with idler sprockets 7, as indicated by the dotted lines in Figure 1. Suitable rollers 8, 9, 11, and 12 are also provided upon the track frames to support the traction belts, as shown. The forward ends of the track frames may be connected with the tractor body by resilient means, not shown.

An important feature of this invention resides in the provision of a hitch particularly adapted for connecting a semi-trailer to a tractor of the crawler type. In the drawings the trailer is indicated generally by the numeral 13. The hitch comprises a pair of side arms 14, preferably tubular in cross section and provided at their lower ends with suitable ball-and-socket joints 15, each comprising a fixed cap 16 and a removable cap 17, adapted to receive a spherical member or ball 18. The members or balls 18 are mounted upon pivot pins 19 supported in suitable forked brackets 21 secured to the track frames 5, as best shown in Figure 4. The forks of the brackets 21 are spaced apart so as to provide side play for the spherical members 18 upon the pins 19. Suitable thrust washers or plates 22 are provided upon the pins 19 to take up the wear and end thrust of the balls 18 against the outer forks of the brackets 21. The caps 16 and 17, members 18, and pins 19 cooperate to provide universal joints or connections between the arms 14 and track frames 5. The end play provided in these joints provides means for compensating for the variation in distance between the centers of the two brackets 21, when the track frames relatively move with respect to one another as when traveling over rough uneven ground.

The upper ends of the arms 14 are suitably secured to side plates 23 which, in turn, are secured by bolts 27 to the side members 24 of the main supporting frame of the hitch. This frame is indicated generally by the numeral 25. The arms 14 are preferably welded to the plates 23, and diagonal braces 26 have their lower ends welded to the arms 14 and their upper ends similarly secured to the plates 23.

Figure 6:
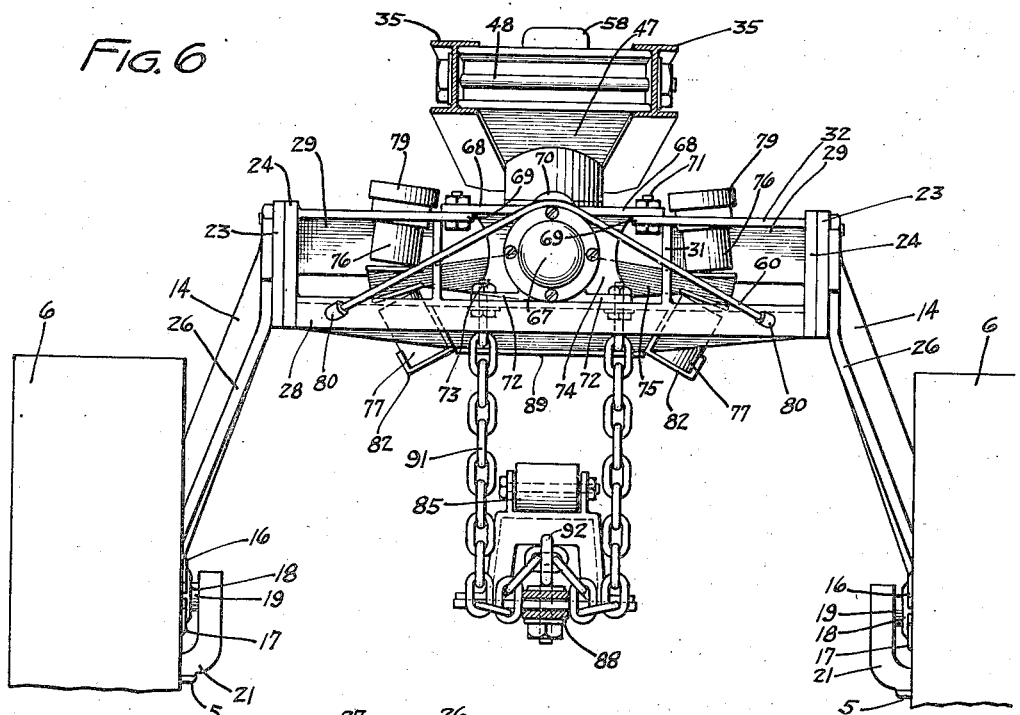
Figure 6 is a rear view of the hitch taken on the line 6—6 of Figure 2.

The supporting frame 25 of the hitch, as shown, comprises a lower cross member 28, preferably of channel cross section, having its ends suitably secured to the end members 24 by such means as welding. Suitable brackets 29, preferably of angle iron cross section, are similarly secured to the end plates 24 and extend inwardly therefrom, as shown in Figures 4 and 6. Each bracket 29 has an upright flange 31 connecting the upper web 32 thereof with the upper face of the lower cross member 28. The brackets 29, plates 24, and cross member 28 are preferably welded together as a unit, and thereby provide a very rigid structure.

Another important feature of the invention resides in the construction of the pivotal connection between the trailer and the hitch, which permits free turning movement of the tractor with respect to the trailer, and also permits free lateral tilting movement of the tractor with respect thereto.

Figure 2:
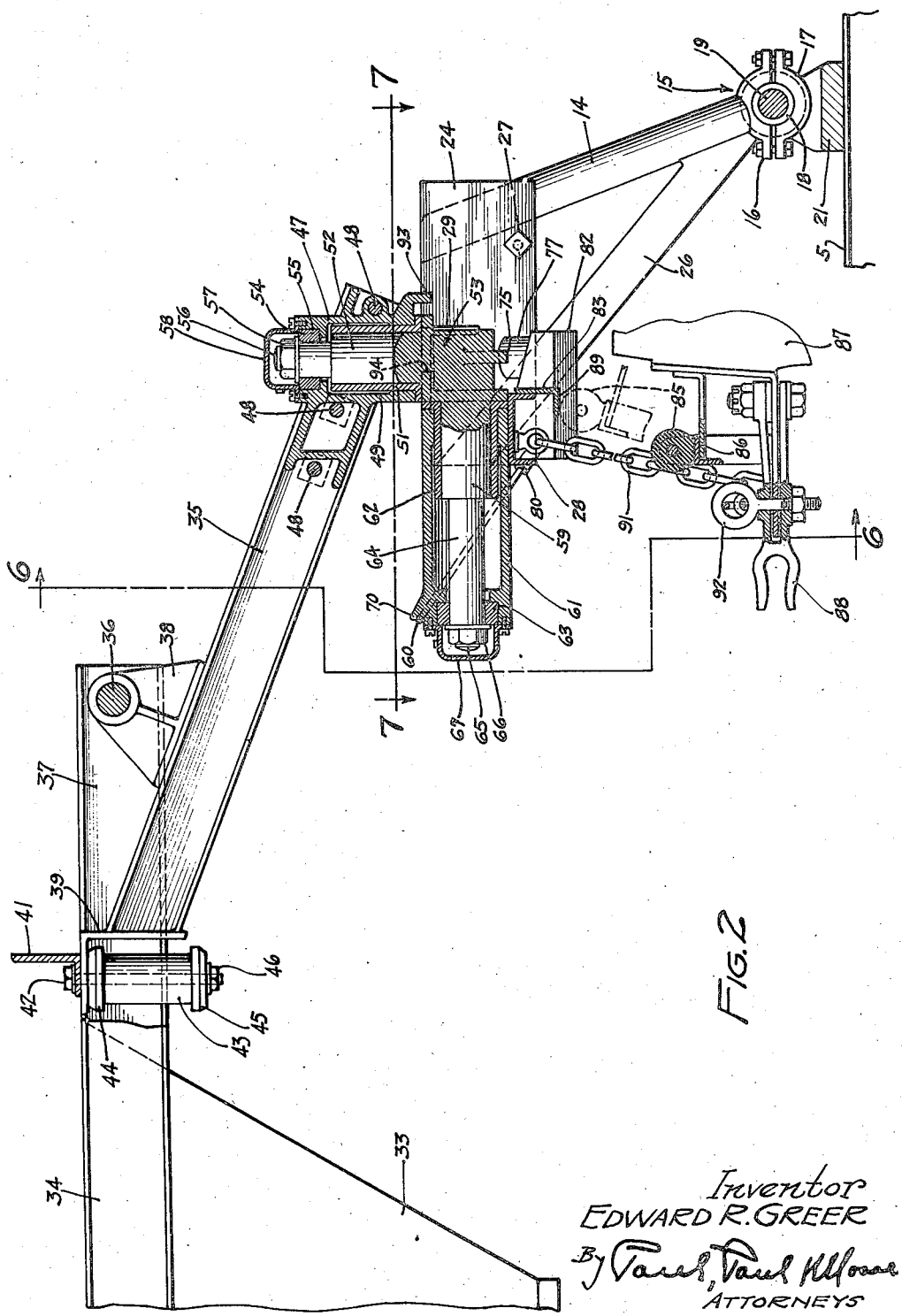
Figure 2 is an enlarged vertical sectional view on the line 2—2 of Figure 3 showing the L-shaped shaft of the hitch.
Figure 3:
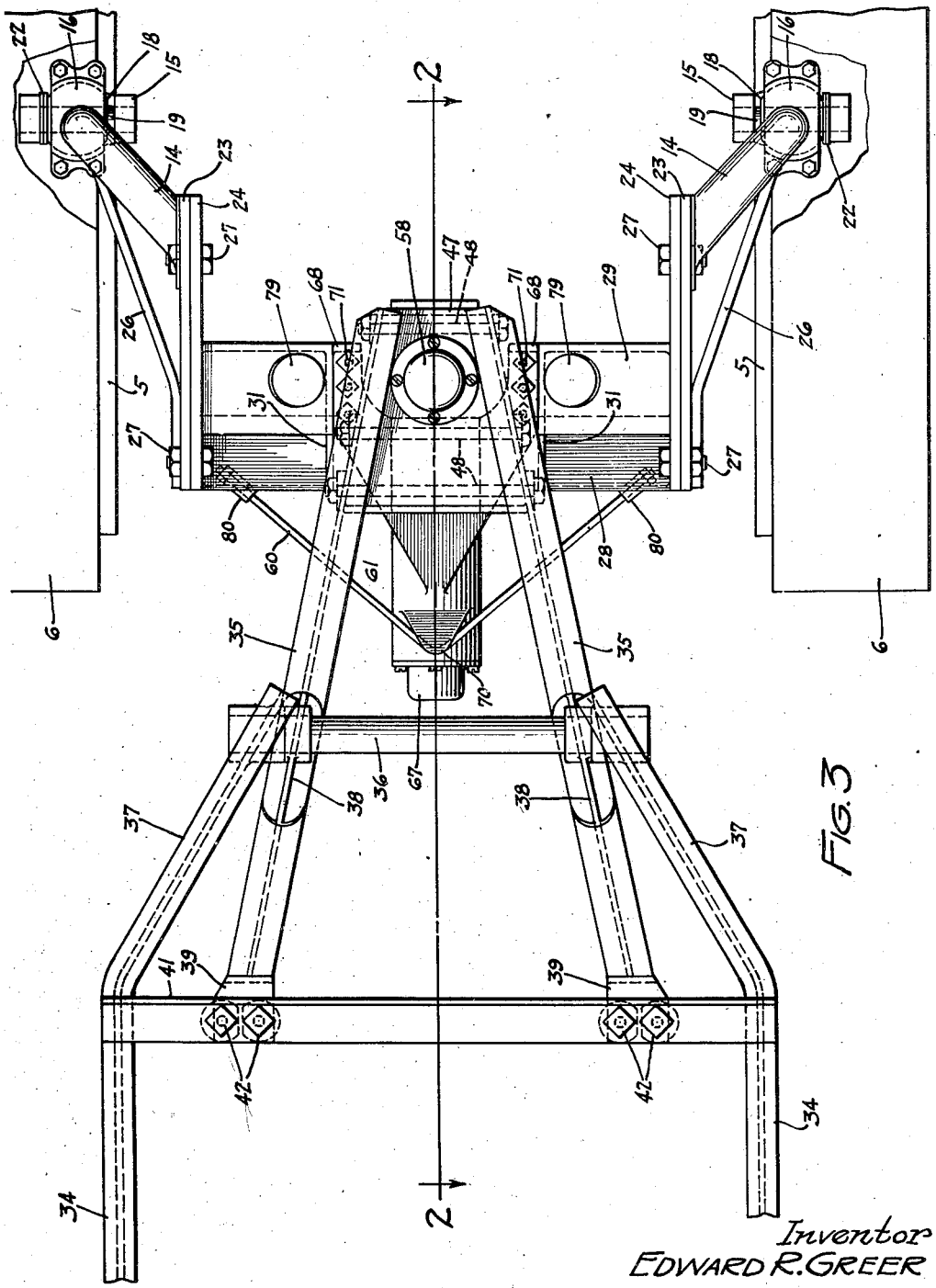
Figure 3 is a plan view of Figure 2.

As best shown in Figures 1, 2, and 3, the trailer comprises a body 33 having upper supporting rails 34, to the forward ends of which a pair of diverging draft beams 35 are pivotally connected by means of a cross shaft 36, shown supported in the inwardly turned end portions 37 of the trailer side rails 34. The draft beams 35 are shown provided with suitable brackets 38 which are pivotally connected with the cross shaft 36. Angle brackets 39 are secured to the rear end portions of the draft beams, and are movably connected with a cross angle 41, secured to the side rails 34 of the trailer. As best shown in Figures 2 and 3, each angle bracket 39 is apertured to receive a pair of bolts 42 which have their upper ends supported in the cross angle 41, and extend through apertures provided in the brackets 39 and a pair of resilient elements 43, preferably of rubber. These elements may be suitably supported upon the bolts 42 between plates or washers 44 and 45, by nuts 46 received in threaded engagement with the bolts 42, as will readily be understood by reference to Figure 2. It will thus be seen that the resilient elements 43 provide means whereby the draft beams 45 may relatively move with respect to the upper trailer rails 34 by compressing the resilient elements 43. These elements thus cushion a portion of the load carried and also the draft load.

A suitable pivot casting 47 is secured to the forward ends of the draft beams 35 by suitable bolts 48, here shown extending through the draft beams and the casting 47, as best shown in Figure 3. The casting 47 has a socket 49 shown provided with a suitable bushing 51. This bushing is adapted to receive the vertical end portion 52 of an L-shaped shaft, indicated generally by the numeral 53. The vertical portion 52 of the L-shaped shaft 53 is preferably reduced at its upper end, as shown at 54, which reduced portion is supported in a suitable bearing collar 55 secured to the upper end of the casting 47. The end portion 56 of the shaft portion 52 is shown threaded to receive a nut 57, whereby the pivot casting 47 cannot become detached from the shaft portion 52. A suitable cap 58 is secured to the upper end of the casting 47 and provides a closure for the threaded terminal of the shaft portion 52.

The L-shaped shaft 53 has a horizontal portion 59 supported in a tubular member 61, here shown provided at one end with a suitable bushing 62 and at its opposite end with a suitable bearing 63, similar to the bearing collar 55 provided in the upper end of the casting 47. The horizontal shaft portion 59 of the L-shaped shaft is also shown provided with a reduced end portion 64 which is guidingly supported in the collar 63 and has a threaded end portion 65 adapted to receive a nut 66. A suitable cap 67 provides a closure for the threaded end portion 65 of the shaft portion 59.

The tubular member 61 is provided with oppositely extending flanges 68 adapted to engage a pair of inwardly projecting flanges 69 provided upon the brackets 29. Suitable bolts 71 secure the flanges 68 to the flanges 69, as best shown in Figures 4 and 6. The tubular member 61 is provided at its lower portion with similar flanges 72 which engage the upper face of the cross member 28 of the hitch frame 25, and may be secured thereto by suitable bolts 73. Suitable reinforcing webs 74 are shown provided between the flanges 68 and 72 of the tubular member 61, as shown in Figure 6. To strengthen the rearwardly projecting end portions of the tubular member 61, a suitable truss rod 60 may be provided having its end portion secured to the cross channel 28 as indicated at 80, and having its intermediate portion engaged with a lug 70 provided upon the upper rear portion of the tubular members 61.

Means are provided for limiting the lateral tilting movement of the tractor with respect to the trailer and as here shown, consists of a rocker 75 secured to the L-shaped shaft 53 and having its end portions movably positioned between resilient elements 76 and 77. The elements 76 are supported in suitable sockets 78 provided in the upper webs 32 of the brackets 29, and are retained therein by suitable caps 79 received in threaded engagement with the upper portions of the annular flanges defining the sockets 78, and by means of pins 81 traversing said flanges and the upper portions of the resilient elements 76.

The lower resilient elements 77 are supported upon the cross channel 28 by suitably shaped brackets 82, preferably welded to the channel 28 and to an angle iron 83, which may be welded to the channel 28 and to the end plates 24 thereof. The elements 76 and 77 of each pair of said elements are oppositely disposed as shown in Figure 4, and are so arranged that when the rocker 75 is in its normal horizontal position, the resilient elements 76 and 77 will be extended and will substantially engage the opposite faces of the end portions thereof. When the trailer laterally tilts or rocks with respect to the tractor, the rocker 75, which is rigidly secured to the L-shaped shaft 53, will rock with the trailer, as shown in Figure 5, whereby one end thereof will engage one of the elements 76, and the other end thereof, one of the elements 77 and compress them as shown, thereby limiting the relative lateral tilting movement of the trailer and tractor. The lower elements 77 are secured to the channel brackets 82 by suitable pins 84 to prevent them from becoming detached therefrom.

Means is also provided for limiting the tilting movement of the tractor upon the pivot pins 19, and as best shown in Figure 2, comprises a resilient element 85 preferably of rubber, secured to a suitable support 86 provided upon a rear portion 87 of the tractor body 2. The usual draw bar 88 is shown secured to the rear portion 87 of the tractor body in the usual manner.

The resilient element 85 is adapted to engage the lower horizontal flange 89 of the cross angle 83, as indicated by the dotted lines in Figure 2, to thereby limit the oscillatory or tilting movement of the tractor or trailer in one direction, in a plane lengthwise of the tractor. To limit the tilting movement of the tractor or trailer in the opposite direction, a suitable chain 91 is provided which has its upper ends secured to the cross channel 28, and its intermediate portion connected to the draw bar 88, by such means as an eye bolt 92. Thus, when the forward end of the tractor rears up, the chain 91 will become taut and limit such tilting movement of the tractor.

Figure 7:
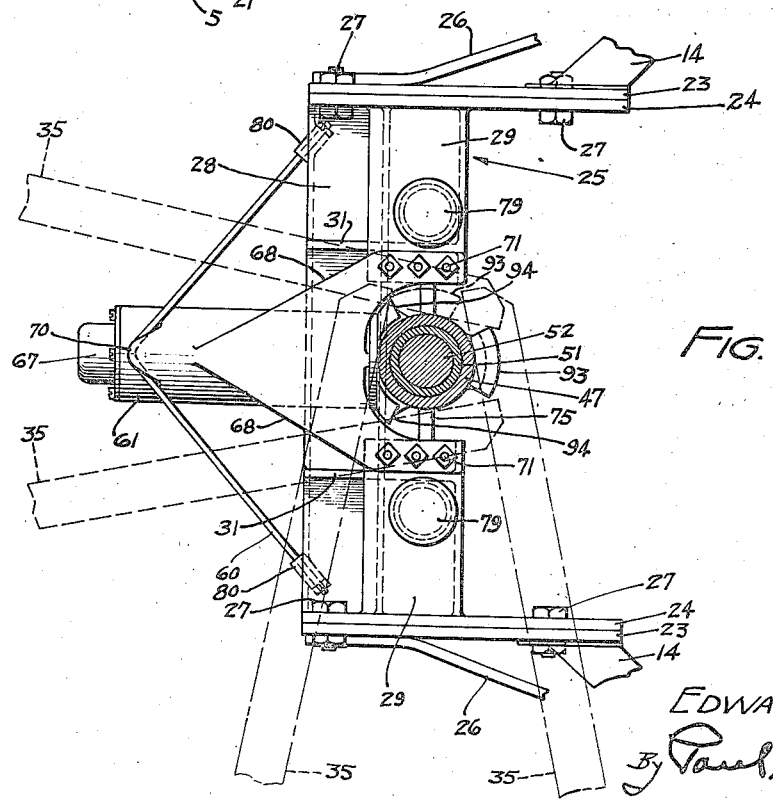
Figure 7 is a sectional plan view on the line 7—7 of Figure 2, showing the means for limiting turning movement of the tractor with respect to the trailer.

Means is provided for limiting the turning movement of the tractor with respect to the trailer and, as shown in Figures 2 and 7, comprises a depending lug 93 provided upon the pivot casting 47 of the draft beams 35. This lug is adapted to engage a pair of abutments 94 provided upon the L-shaped shaft 53 directly beneath its vertical portion 52, as shown in full lines in Figure 7 and dotted lines in Figure 2. In Figure 7, the full lines show the lug 93 in the position assumed when the trailer is longitudinally alined with the tractor, and the dotted lines in this same figure show the lug 93 engaged with one of the abutments 94 to thereby limit the turning movement of the tractor with respect to the trailer, in one direction. The lug 93 and abutments 94 are preferably arranged so that the tractor may be turned substantially at right angles to the trailer, as indicated by the dotted lines in Figure 7.

The novel hitch herein disclosed, and as best shown in Figure 2, comprises three axes which permit universal movement of the trailer with respect to the tractor. The alined axes of the laterally disposed pivot pins 19 connecting the arms 14 of the hitch to the track frames 5 of the tractor, permit free up-and-down movement of the forward end of the tractor, which movement is limited in one direction by the resilient element 85 and angle iron 89, and in the opposite direction by the chain 91. The rocking or lateral tilting movement of the tractor with respect to the trailer is about the axis of the horizontally disposed portion 59 of the L-shaped shaft 53. This lateral tilting movement is limited by the rocker 75 and resilient elements 76 and 77. The turning movement of the tractor with respect to the trailer is about the axis of the vertical portion 52 of the L-shaped shaft 53, whereby the tractor may be relatively turned in either direction to guide the apparatus. Such turning movement of the tractor is limited by the lug 93 and abutments 94.

It will also be noted by reference to Figure 1, that the pivotal connections between the hitch and the track frames is forwardly of the sprocket shafts 3 of the tractor, and preferably between the rollers 8 and 9 of the track frames. By thus locating these pivots forwardly of the sprocket shafts 3, the weight of the hitch, and also the weight of the forward portion of the trailer will be transmitted to the track frames forwardly of the pivotal connections of the track frames with the tractor body, which additional weight will tend to hold the track frames flatly against the ground, and will also prevent the forward end of the tractor from raising, when the tractor is subjected to a heavy pulling load.

It will further be noted by reference to Figures 1, 2, and 4, that the hitch is connected directly to the track frames and has no connection whatsoever with the tractor body, except through the chain 91. The hitch may be quickly attached to a tractor by simply securing the forked brackets 41 to the track frames 5 thereof, as shown in Figure 4. The trailer may be readily disconnected from the tractor by removal of the cap 58 and nut 57, after which the bearing bracket 47 may be detached from the upright shaft portion 52 of the L-shaped shaft 53. When the trailer is thus detached from the hitch, the weight of the latter may be supported directly upon the resilient element 85 provided at the rear portion 87 of the tractor body, as will be understood by reference to Figure 2. The trailer may also be disconnected from the tractor by removing the four bolts 27 from the plates 23 and 24. When thus disconnected, the major portion of the hitch will remain attached to the trailer, while only the arms 14 and plates 23 will remain connected to the tractor. To disconnect the entire hitch from the tractor, the arms 14 are detached from the track frames 5 by removing the pivot pins 19. When the arms are thus removed from the track frames, and also when the trailer is disconnected from the tractor by removing the bolts 27, the chain 91 must, of course, be disconnected, as will readily be understood by reference to Figures 2 and 6. The hitch is comparatively simple and comprises few operating parts, and because of its unique construction, may be made very rugged, and sturdy, thereby providing such a hitch which is well adapted for connecting a trailer to a tractor.

I claim as my invention:

1. In a hitch for connecting a trailer to a tractor comprising track frames mounted for pivotal movement about a horizontal axis and provided with suitable traction belts said hitch having universal connections with said track frames forwardly of said axis, whereby a portion of the weight of the load carried by the trailer will be transmitted to said track frames and tend to hold the traction belts flatly against the ground, said hitch member comprising an integral L-shaped pivot member.

2. In a hitch for connecting a trailer to a tractor comprising track frames mounted for pivotal movement about a horizontal axis and provided with suitable traction belts said hitch comprising a pair of arms having pivotal connections with said track frames at points forwardly of said axis, whereby the weight of the hitch and a portion of the weight of the trailer will be supported upon said track frames to hold the traction belts flatly against the ground.

3. In a hitch for connecting a trailer to a tractor comprising track frames mounted for pivotal movement about a horizontal axis and provided with suitable traction belts, said hitch comprising a pair of arms having pivotal connections with said track frames at points forwardly of said axis, whereby the weight of the hitch and a portion of the weight of the trailer will be supported upon said track frames to hold the traction belts flatly against the ground, and means associated with said pivotal connections for permitting relative lateral movement of said track frames without imparting severe strains to the parts of the hitch.

4. In a hitch for connecting a semi-trailer to a tractor comprising track frames mounted for independent movement about horizontal axes, said hitch comprising a pair of downwardly extending arms, ball-and-socket joints connecting said arms with said track frames forwardly of said axes and each comprising a horizontally disposed transverse pivot, and means permitting relative lateral movement of said arms with respect to said track frames.

5. In a hitch for connecting a semi-trailer to a tractor comprising track frames mounted for independent movement about horizontal axes, said hitch having means for pivotally connecting it to said track frames forwardly of said axes, whereby a portion of the weight of the trailer and its load will be supported directly upon the track frames to thereby resist raising of the forward ends thereof, said hitch also comprising a vertically disposed pivot permitting turning movement of the tractor with respect to the trailer, and a horizontally disposed pivot extending lengthwise of the tractor and permitting relative lateral tilting movement of the tractor with respect to the trailer, and means for securing together said vertical and horizontal pivots.

6. In a hitch for connecting a trailer to a tractor comprising track frames mounted for independent movement about horizontal axes, said hitch comprising a pair of arms connected with said track frames by suitable universal joints, and each of said joints comprising means for permitting side play or movement of said arms with respect to the track frames to compensate for variations in the distance between said universal joints, when the track frames are disposed in different angular positions, as when traveling over uneven ground.

7. In a hitch for connecting a trailer to a tractor comprising track frames mounted for independent movement about horizontal axes, said hitch comprising a pair of arms having universal connections with said track frames forwardly of said horizontal axes, an L-shaped pivot member permitting turning movement of the tractor with respect to the trailer and also lateral rocking movement of the tractor with respect thereto, said L-shaped pivot member and universal connections allowing free movement of the tractor with respect to the trailer without imparting severe strains to the parts thereof, and suitable cushion members for limiting the tilting movements of the tractor with respect to the trailer.

8. In a hitch for connecting a trailer to a tractor comprising track frames mounted for independent pivoted movement about horizontal axes, said hitch comprising a pair of arms adapted to straddle the rear portion of the tractor body and having universal connections with the tractor track frames and whereby the hitch and a portion of the load of the trailer will be supported upon said track frames independently of the tractor body, said universal connections comprising means for permitting free independent movement of said track frames with respect to the hitch to compensate for the change in distance between the pivotal connections of the arms with the track frames when said frames are disposed at different angular positions, as when traveling over uneven ground.

9. In a hitch for connecting a trailer to a tractor comprising track frames mounted for independent movement about horizontal axes, said hitch comprising a frame having forwardly and downwardly extending arms, ball-and-socket joints connecting said arms with said track frames forwardly of said axes, whereby a portion of the weight of the trailer will resist raising of the forward end of the tractor, an L-shaped pivot member on the hitch having a vertically disposed portion pivotally connected with the forward end of the trailer and permitting free turning movement of the tractor and trailer, and a horizontally disposed portion extending lengthwise of the tractor and permitting free lateral tilting movement of the tractor with respect to the trailer, and resilient means for limiting lateral and longitudinal tilting movements of the tractor with respect to the trailer.

10. In a hitch for connecting a trailer to a tractor comprising track frames mounted for independent movement about horizontal axes, said hitch comprising a frame having forwardly and downwardly extending arms, means for pivotally connecting said arms with said track frames forwardly of said axes, and independently of the tractor body, a horizontal bearing on the hitch frame disposed lengthwise of the tractor, an L-shaped pivot member mounted in said bearing and having a portion extending upwardly and pivotally connected with the forward end of the trailer and permitting free turning movement of the tractor and trailer, and the horizontally disposed portion of said pivot member and bearing cooperating to permit free lateral tilting or rocking movement of the tractor with respect to the trailer, and resilient means for limiting lateral and longitudinal tilting movements of the tractor with respect to the trailer.

11. In a hitch for connecting a semi-trailer to a tractor, said hitch comprising vertically and horizontally disposed pivots permitting turning and lateral tilting movements of the tractor, the axes of said pivots lying in a plane substantially coincident with the longitudinal center line of the tractor, a pair of arms adapted to straddle a portion of a tractor body, and means for connecting said arms to the usual track frames of the tractor independently of the tractor body.

12. In a hitch for connecting a semi-trailer to a tractor, said hitch comprising vertically and horizontally disposed pivots, a supporting member therefor and a pair of arms on said member having pivotal connections with the sides of the tractor, said pivotal connections comprising laterally disposed pivot pins, and said hitch being readily detachable from the tractor by removal of said pivot pins.

13. In a hitch for connecting a semi-trailer to a tractor, said hitch comprising vertically and horizontally disposed pivots, readily detachable means on the tractor for supporting said pivots in a plane substantially coincident with the longitudinal center line of the tractor, means on the forward end of the trailer adapted to receive said vertically disposed pivot, means permitting lateral tilting or rocking movement of the tractor with respect to the trailer, and means for limiting the pivotal movements of the tractor in all directions.

14. In a hitch for connecting a semi-trailer to a tractor, said hitch comprising a frame having arms depending therefrom and pivotally connected to the sides of the tractor, an L-shaped pivot member mounted on said frame and having an upright portion adapted to be pivotally connected with the forward end of the trailer, and means for limiting turning and tilting movements of the tractor with respect to the trailer.

15. In a hitch for connecting a trailer to a tractor, a supporting member having means for pivotally connecting it to the tractor, said supporting member having a horizontal bearing therein extending lengthwise of the tractor, an L-shaped pivot member comprising a portion fitting in said bearing and having an upstanding portion providing a vertical pivot, and means at the forword end of the trailer adapted to receive said vertical pivot to secure the trailer to said supporting member, the horizontal and vertical portions of said pivot member providing a universal connection between the tractor and trailer, whereby the tractor may freely tilt or rock laterally about its longitudinal axis, regardless of the angular relationship between the tractor and trailer.

16. In a hitch for connecting a trailer to a tractor, a transversely disposed supporting member, arms secured to the ends thereof and extending downwardly therefrom and having means at their lower ends for pivotally connecting them to a tractor, a horizontal bearing in said supporting member disposed lengthwise of the tractor, an integral L-shaped pivot member comprising a portion fitting in said bearing and having another portion extending upwardly to provide a vertical pivot, means at the forward end of the trailer adapted to receive said vertical pivot to connect the trailer to the tractor, and means for limiting the rocking and tilting movements of the tractor with respect to the trailer.

17. In a hitch for connecting a semi-trailer to a tractor comprising a drive shaft and track frames mounted for independent pivotal movement about the axis of said shaft, said hitch comprising downwardly extending arms having universal connections with said track frames forwardly of said drive shaft, and said universal connections comprising horizontally disposed transverse pivots and means permitting relative lateral movement of said arms with respect to said track frames.

18. In a hitch for connecting a semi-trailer to a tractor comprising track frames mounted for independent pivotal movement and having traction belts mounted thereon, said hitch comprising downwardly extending arms having universal connections with said track frames forwardly of the rearmost points of contact of said traction belts with the ground, said universal connections comprising horizontally disposed transverse pivots and supports therefor, and means permitting relative lateral movement of said arms with respect to said track frames.

19. In a hitch for connecting a semi-trailer to a tractor comprising track frames mounted for independent pivotal movement and having traction belts mounted thereon, said hitch having means for pivotally connecting it to said track frames forwardly of the rearmost points of contact of the traction belts with the ground, whereby a portion of the weight of the trailer and its load is supported upon the track frames and will resist raising of the forward ends thereof, said hitch also comprising a vertically disposed pivot permitting turning movement of the tractor with respect to the trailer, and a horizontally disposed pivot extending lengthwise of the tractor and permitting relative lateral tilting movement of the tractor with respect to the trailer, and means for connecting together said vertical and horizontal pivots.

20. In a hitch for connecting a semi-trailer to a tractor comprising track frames mounted for independent pivotal movement and having traction belts mounted thereon, said hitch comprising an arched supporting member composed of an intermediate transverse section and downwardly extending arms at the ends thereof pivotally connected at their lower ends to said track frames forwardly of the rearmost points of contact of said traction belts with the ground, whereby a portion of the weight of the trailer and its load is supported upon the track frames and will resist raising of the forward ends thereof, said arched member straddling the rear portion of the tractor body and permitting free relative movement of the tractor body, a vertically disposed pivot mounted on said arched member having means for connecting it to the forward end of a trailer, said vertical pivot being mounted for relative swinging movement in a plane transverse to the line of travel, whereby the tractor may laterally tilt with respect to the trailer.

21. In a hitch for connecting a trailer to a tractor, a supporting member connected to the tractor, said supporting member having a horizontal bearing therein extending lengthwise of the tractor, an L-shaped pivot member comprising a portion fitting in said bearing and having an upstanding portion providing a vertical pivot, and means at the forward end of the trailer adapted to receive said vertical pivot to connect the trailer to the tractor, the horizontal and vertical portions of said pivot member providing a universal connection between the tractor and trailer, whereby the tractor may freely tilt or rock laterally about its longitudinal axis, regardless of the angular relationship between the tractor and trailer.

22. In a hitch for connecting a trailer to a tractor, a supporting member secured to the tractor, said supporting member having a horizontal bearing therein extending lengthwise of the tractor, an integral, one-piece pivot member comprising a horizontal portion fitting in said bearing and having an upstanding portion providing a vertical pivot, and means at the forward end of the trailer adapted to receive said vertical pivot to connect the trailer to the tractor, the horizontal and vertical portions of said pivot member providing a universal connection between the tractor and trailer, whereby the tractor may freely tilt or rock laterally about its longitudinal axis, regardless of the angular relationship between the tractor and trailer.

EDWARD R. GREER.